(12) United States Patent
Liu

(10) Patent No.: US 12,520,939 B1
(45) Date of Patent: Jan. 13, 2026

(54) FURNITURE ANTI-TIP DEVICE

(71) Applicant: Changzhou Joshua Home Furnishing Co., Ltd., Changzhou (CN)

(72) Inventor: Yantao Liu, Changzhou (CN)

(73) Assignee: Changzhou Joshua Home Furnishing Co., Ltd., Changzhou (CN)

( * ) Notice: Subject to any disclaimer, the term of this patent is extended or adjusted under 35 U.S.C. 154(b) by 0 days.

(21) Appl. No.: 19/250,579

(22) Filed: Jun. 26, 2025

(30) Foreign Application Priority Data

Jun. 13, 2025 (CN) .......................... 202521211605.5

(51) Int. Cl.
*A47B 97/00* (2006.01)
*A47B 91/08* (2006.01)

(52) U.S. Cl.
CPC .............. *A47B 97/00* (2013.01); *A47B 91/08* (2013.01); *A47B 2097/008* (2013.01)

(58) Field of Classification Search
CPC ... A47B 2097/008; A47B 91/08; A47B 97/00; F24C 15/083
USPC ...................... 248/501–502, 503.1, 499–500, 248/188.8–188.91
See application file for complete search history.

(56) References Cited

U.S. PATENT DOCUMENTS

| | | | | | |
|---|---|---|---|---|---|
| 1,598,438 | A | * | 8/1926 | Hallowell | G09F 15/0056 248/188.8 |
| 1,810,045 | A | * | 6/1931 | Heiniger | E06C 7/46 248/188.9 |
| 2,295,676 | A | * | 9/1942 | Meyer | A47B 96/061 248/536 |
| 2,409,622 | A | * | 10/1946 | Gottfried | A47C 7/002 248/188.9 |
| 2,423,659 | A | * | 7/1947 | Rabe | A47B 91/04 248/188.9 |
| 8,424,828 | B1 | * | 4/2013 | Roccasalva | A47B 95/00 248/346.11 |
| 2004/0094496 | A1 | * | 5/2004 | MacDonald | B65G 1/02 211/183 |
| 2021/0353062 | A1 | * | 11/2021 | Nagy | A47B 91/12 |

FOREIGN PATENT DOCUMENTS

| | | |
|---|---|---|
| CN | 215076853 U | 12/2021 |
| CN | 216907337 U | 7/2022 |
| CN | 217885478 U | 11/2022 |

* cited by examiner

*Primary Examiner* — Christopher Garft
(74) *Attorney, Agent, or Firm* — Westbridge IP LLC

(57) ABSTRACT

A furniture anti-tip device includes: a support structure, including a support body, the support body being horizontally arranged; a fastening structure, including a fastening body extending vertically upward along the support structure; a first fastening portion, disposed on the fastening body and configured to be securely fastened to a side surface of a furniture leg; and a second fastening portion, disposed on the fastening body, horizontally extending in a direction opposite to the supporting body, and configured to be securely fastened to a bottom surface of the furniture leg.

8 Claims, 4 Drawing Sheets

FURNITURE ANTI-TIP DEVICE

CROSS-REFERENCE TO RELATED APPLICATIONS

This application claims priority to Chinese Patent Application No. 202521211605.5, filed on Jun. 13, 2025, the content of which is incorporated herein by reference in its entirety.

TECHNICAL FIELD

The application relates to the technical field of furniture accessories, in particular to a furniture anti-tip device.

BACKGROUND

In daily life, people use various types of furniture, such as cabinets, which serve storage or decorative purposes in homes. Most existing cabinets are placed against walls. When items inside the cabinet cause it to become unstable or when children climb on the cabinet, it may tip over, potentially injuring nearby people or damaging other furniture or items. To prevent such incidents, additional anti-tip structures can be applied to furniture.

For example, Chinese Patent Publication CN215076853U discloses a furniture anti-tip device that operates by coordinating two fixed components. In this technical solution, the fixed components are secured to the wall and the back surface of the furniture via adhesive bonding. Each fixed component features holes through which securing straps can pass, allowing the wall and furniture to be quickly connected by tightening the straps. However, since the adhesive method is not sufficiently secure and the securing straps are prone to breaking, the anti-tip device in this technical solution, although low-cost, lacks adequate safety.

The anti-tip device in Chinese Patent Publication CN216907337U is composed of an L-shaped positioning plate and a mating block. The L-shaped positioning plate is fixed to the lower corner surface of the furniture cabinet near the wall. The horizontal end face of the L-shaped positioning plate has an insertion slot in the middle, and the mating block is movably inserted into the insertion slot of the L-shaped positioning plate. The outer bottom end of the mating block is vertically fixed with a connection column, and a fixed disk is set on the end face of the connection column away from the mating block. The fixed disk is fixedly adhered to the ground.

The solution in Chinese Patent Publication CN216907337U improves anti-tip performance, but it requires assembly on the wall side and involves numerous components, resulting in lower convenience. Additionally, the adhesive properties of the fixed plate may deteriorate (and this area is difficult to inspect), leaving the cabinet at risk of tipping over and posing significant safety hazards.

SUMMARY

To address at least one of the above technical issues, the present application provides the following technical solution.

A furniture anti-tip device comprises:
a support structure, including a support body, wherein the support body is horizontally arranged;
a fastening structure, including a fastening body extending vertically upward along the support structure;
a first fastening portion, disposed on the fastening body and configured to be securely fastened to a side surface of a furniture leg; and
a second fastening portion, disposed on the fastening body, horizontally extending in a direction opposite to the supporting body, and configured to be securely fastened to a bottom surface of the furniture leg.

Preferably, a bottom surface of the second fastening portion is higher than a plane where a bottom surface of the support body is located;
a connection portion between a side of the fastening body which used to establish a connection with a side of the furniture leg and a bottom surface of the support body forms an inclined surface, the inclined surface tilts toward a direction of the support body, thereby forming a triangular through hole between the furniture leg, a ground, and the furniture anti-tip device.

More preferably, the first fastening portion has a first through hole through which a first fastening member can pass, with one end of the first fastening member restricted outside the first through hole and an other end securely fastened to the side surface of the furniture leg;
the second fastening portion has a second through hole through which a second fastening member can pass, with one end of the second fastening member restricted outside the second through hole and an other end securely fastened to the bottom surface of the furniture leg;
a bottom surface of the second fastening member is in the same plane as a bottom surface of the fastening body after the furniture anti-tip device is assembled with the furniture leg.

More preferably, the second fastening member extends into a connection hole provided at a bottom of the furniture leg after passing through the second through hole, the connection hole extends along the axial direction of the furniture leg, and the length of the second fastening member extending into the connection hole is adjustable;
the first through hole is configured such that when the first fastening portion moves upward or downward along the furniture leg, the first fastening member can always pass through the first through hole and securely fastened to the side of the furniture leg.

Preferably, two side portions of the fastening body are respectively connected to a side portion of the support body located on the same side via a first reinforcing member.

More preferably, wherein an upper surface of the support body and a surface of the fastening body adjacent to the upper surface of the support body are connected via a second reinforcing member.

More preferably, the first reinforcing member has a triangular planar structure, the second reinforcing member has an inclined planar structure, and the first reinforcing member connects to the second reinforcing member.

Preferably, a side of the support body is provided with a transition section extending from the end of the first reinforcing member toward the end of the support body.

More preferably, sizes of the second fastening section, the first reinforcing member, and the transition section are adjusted according to the following ratio:
when a height of the fastening body relative to the plane where a bottom of the support body is located as 100 mm:
a height of a bottom surface of the second fastening portion relative to a plane where the bottom of the support body is located is 12-15 mm;

a height of a highest part of the first reinforcing member relative to a plane where a top of the transition section is located is 25-35 mm;

a height of a highest part of the transition section relative to a plane where the upper surface of the support body is located is 2-3.5 mm.

Preferably, a middle portion of the support body is provided with a reinforcing strip protruding upward; a bottom portion of the support body and a side portion of the fastening body facing the furniture leg are hollow structures and are provided with grid-shaped reinforcing ribs.

The technical solution provided by this application achieves the following beneficial effects:

The anti-tip device provided by this application has a simple main structure which is easy to assemble, and, after assembly, the anti-tip device is securely connected to both the side and bottom of the furniture leg. Compared to existing adhesive-type or single-side connection anti-tip devices, it provides a more secure connection to the furniture leg, effectively reducing the risk of furniture tipping over, and offers higher stability and safety. Additionally, in the anti-tip device of this application, a "triangular structure" with a right angle can be enclosed between the vertical plane where the support body is located and the horizontal plane where the fastening body is located, further enhancing stability and reducing the risk of furniture tipping.

BRIEF DESCRIPTION OF THE DRAWINGS

In order to more clearly illustrate the technical solutions in the embodiments of this application, the following is a brief introduction to the drawings used in the description of the embodiments. Obviously, the drawings described below are only some embodiments of this application. For those skilled in the art, other drawings may be obtained based on the provided drawings without creative work.

DETAILED DESCRIPTION OF THE EMBODIMENTS

Figure 1:
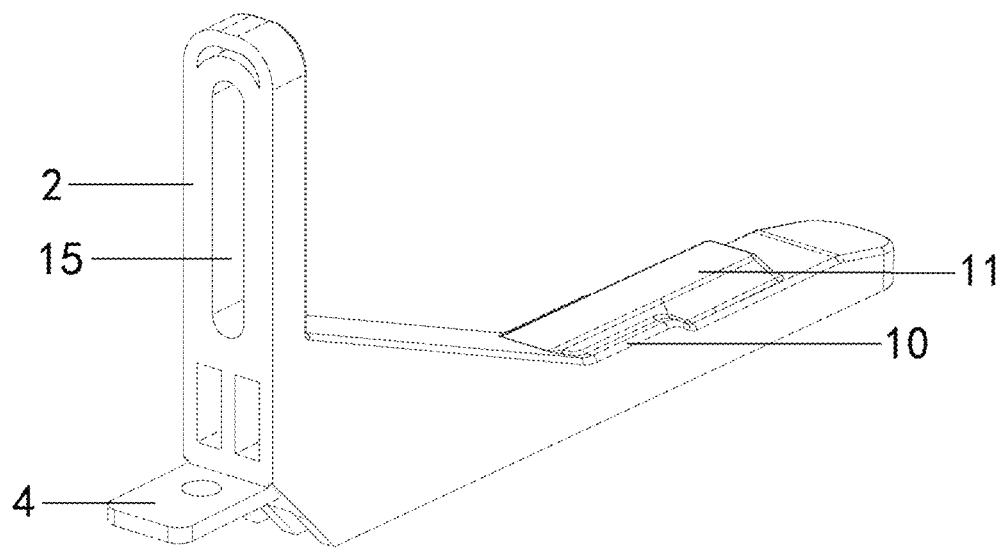
FIG. 1 is a three-dimensional structural schematic diagram of a furniture anti-tip device.

To make the objectives, technical solutions, and beneficial effects of the embodiments disclosed herein clearer, the technical solutions of the embodiments will be described in detail with reference to the accompanying drawings. It should be noted that the embodiments described herein are only some examples of the present application and not all of them. Based on the embodiments in the present application, all other embodiments obtained by those skilled in the art without creative efforts fall within the protection scope of the present disclosure.

Referring to FIG. 1 to FIG. 5, the furniture anti-tip device provided in this embodiment mainly comprises a support structure 13 and a fastening structure 14. The support structure 13 includes a support body 1, which is horizontally arranged. The fastening structure 14 includes a fastening body 2 that extends vertically upward along the support structure 13.

The fastening body is provided with a first fastening portion 3 and a second fastening portion 4. The first fastening portion 3 is used to achieve a fastening connection with the side of the furniture leg 5. The second fastening section 4 extends horizontally in the opposite direction to the support body 1 and is used to achieve a fastening connection with the bottom surface of the furniture leg 5. In this embodiment, the first fastening portion 3 and the second fastening portion 4 may be connected to the furniture leg via threaded connections, snap-fit connections, riveting, or other methods to form a fastening connection.

The anti-tip device in this embodiment has a simple main structure, is easy to assemble, and, once assembled, securely connects to both the side and bottom of the furniture leg. Compared to existing adhesive-type or single-side connection anti-tip devices, the anti-tip device in this embodiment provides a more secure connection to the furniture leg, effectively reducing the risk of furniture tipping over, and offers higher stability and safety. Additionally, in the anti-tip device of this embodiment, a "triangular structure" with a right angle can be enclosed between the vertical plane where the support body is located and the horizontal plane where the fastening body is located, further enhancing stability and reducing the risk of furniture tipping.

Figure 3:
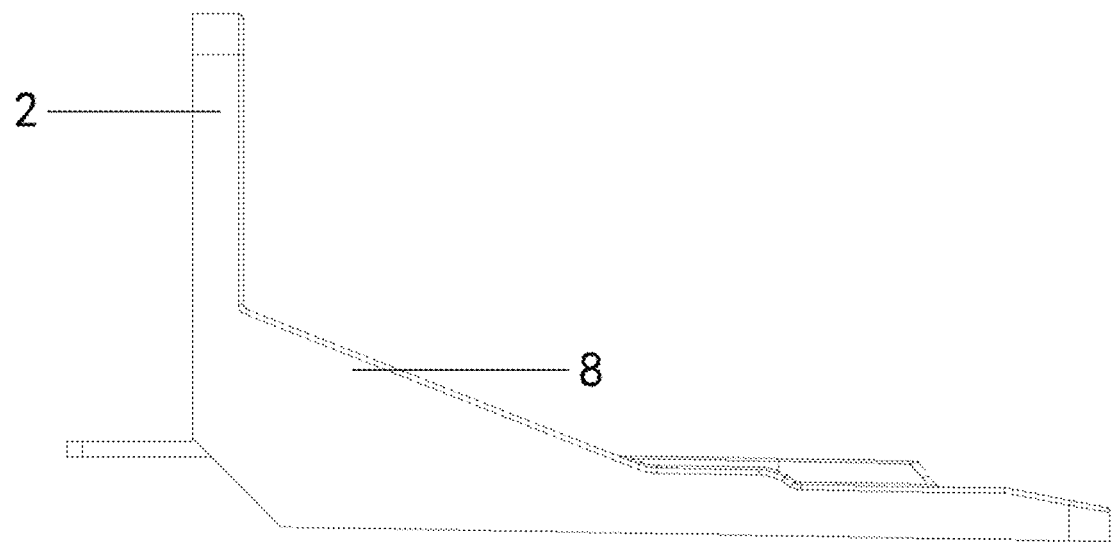
FIG. 3 is a side structural schematic diagram of the furniture anti-tip device.
Figure 4:
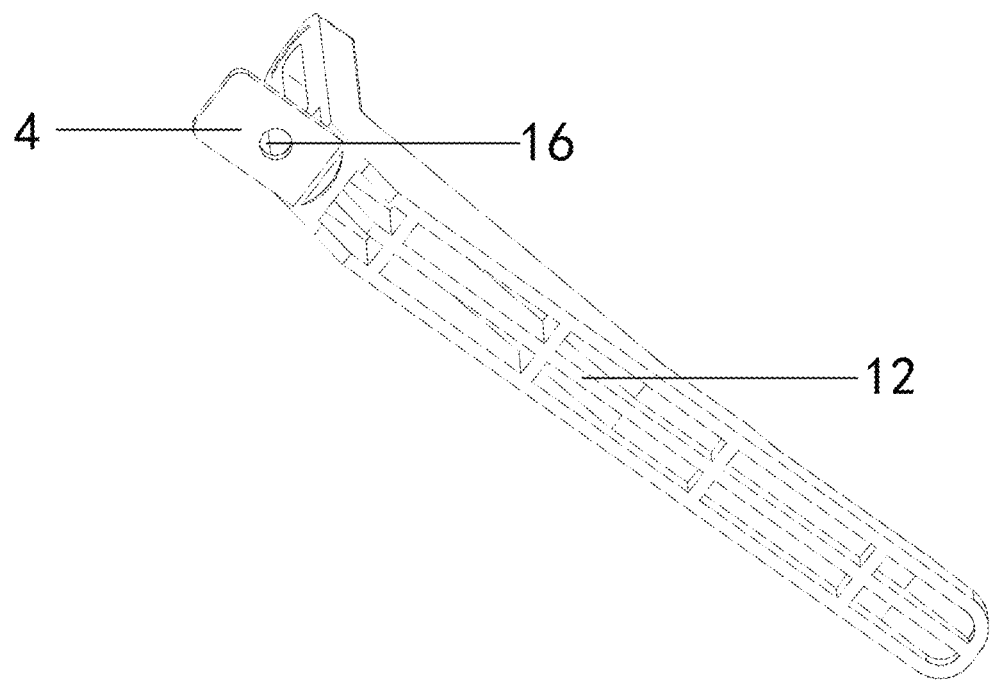
FIG. 4 is a bottom structural schematic diagram of the furniture anti-tip device.

In a preferred embodiment, the bottom surface of the second fastening portion 4 is higher than the plane where the bottom surface of the support body 1 is located. Furthermore, as shown in FIG. 3, the connection portion between a side of the fastening body 2 which used to establish a connection with a side of the furniture leg 5 and a bottom surface of the support body 1 forms an inclined surface, the inclined surface tilts toward a direction of the support body 1. That is, after assembly with the furniture leg, a triangular through-hole region is formed between the furniture leg, the ground, and the anti-tip device, further enhancing stability.

In an exemplary structure of this embodiment, the first fastening portion 3 has a first through hole 15 through which the first fastening member 6 can pass. One end of the first fastening member 6 is restricted outside the first through hole 15, while the other end passes through the first through hole 15 and is securely connected to the side of the furniture leg 5. The first fastening member 6 may be selected as a bolt or similar fastener. After the first fastening member 6 passes through the first through hole 15 and the through hole in the furniture leg 5, it is threadedly connected to a nut on the other side of the furniture leg 5. Tightening the nut achieves the secure connection between the first fastening portion and the furniture leg 5. Additionally, to reinforce the connection between the anti-tip device and the furniture leg 5, the fastening body may be provided with multiple first through holes allowing bolts to pass through, or elongated through holes capable of accommodating multiple bolts simultaneously.

In another exemplary structure of this embodiment, the second fastening portion 4 may be configured as a square plate structure extending horizontally in the opposite direction to the support body 1 or any other structure capable of assisting in achieving the connection function. The square second fastening portion 4 has a second through hole 16 through which the second fastening member 7 can pass, with one end of the second fastening member 7 restricted outside the second through hole 16 and the other end securely connected to the bottom surface of the furniture leg 5.

The second fastening member 7 may also be selected as a bolt or similar structure. The bottom of the furniture leg 5 is connected to the second fastening member 7 via a threaded connection. In the exemplary structure, the second fastening member 7 extends through the second through hole 16 and further into the connection hole 17 provided at the bottom of the furniture leg 5. This connection hole 17 extends along the axial direction of the furniture leg 5 and has internal threads that mate with the external threads on the surface of the second fastening member 7. In this structure, since the connection is made at the bottom of the furniture leg 5, rotating the second fastening member 7 can adjust the length of the second fastening member 7 extending into the connection hole 17, thereby regulating the height of the leg above the ground. Since the bottom surface of the second fastening member 7 is in the same plane as the bottom surface of the fastening body 2 after assembly (ensuring stability), the end of the second fastening member 7 outside the second through hole 17 preferably has a relatively large surface area and a flat surface (the second fastening member is similar to an "adjustable footpad" and can be connected to the bottom surface of each leg of the furniture).

Figure 2:
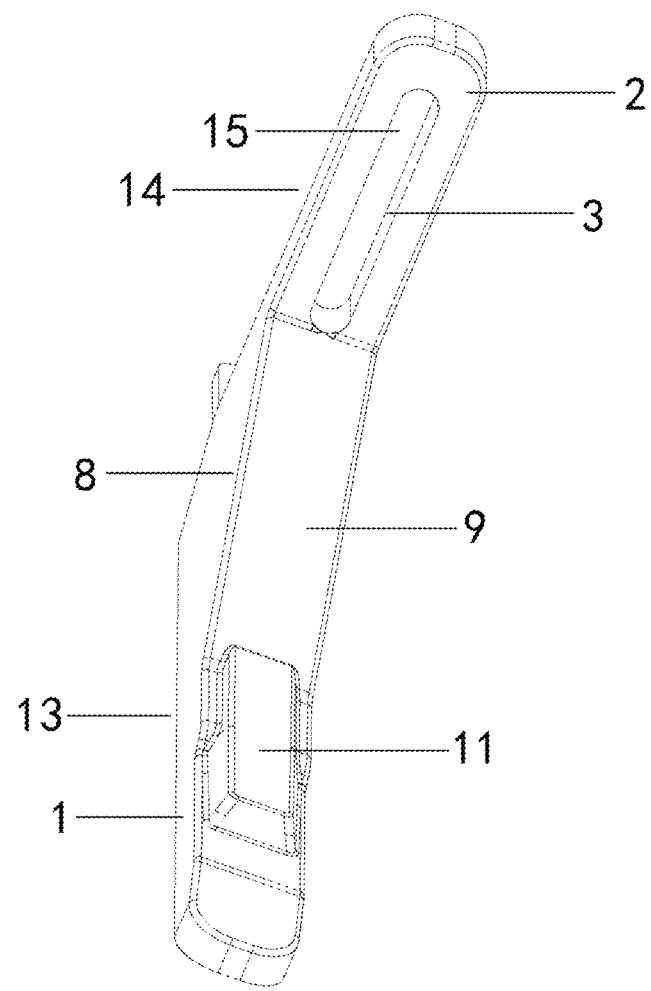
FIG. 2 is a three-dimensional structural schematic diagram of the furniture anti-tip device.

In a preferred embodiment of this example, as shown in FIG. 2, to further enhance the stability and strength of the furniture anti-tip device, the two sides of the fastening body 2 can be connected to the corresponding side of the support body 1 via the first reinforcing member 8. In a more preferred embodiment, the upper surface of the support body 1 and the surface of the fastening body 2 adjacent to the upper surface of the support body 1 are connected via a second reinforcing member 9.

In a preferred embodiment, the first reinforcing member 8 is a triangular planar structure connecting the triangular region between the side of the fastening body 2 and the side of the support body 1, and the second reinforcing member 9 is an inclined planar structure, with the first reinforcing member 8 and the second reinforcing member 9 connected to each other.

In a preferred embodiment, the side of the support body 1 further includes a transition section 10 extending from the end of the first reinforcing member 8 toward the end of the support body 1, with both the end of the transition section 10 and the end of the support body 1 exhibiting a gradually decreasing height trend.

The sizes of the furniture anti-tip device may be adjusted according to different usage scenarios and are not limited.

For example, the total length of the support body 1 of the furniture anti-tip device in this embodiment can be set to 180 mm (the vertical distance from the end of the support body 1 to the plane on the side of the fastening body 2 facing the furniture leg), and the total height of the fastening body 2 can be set to 100 mm (the height of the fastening body 2 relative to the plane on the bottom surface of the support body 1).

Among these, the sizes of the second fastening portion 4, the first reinforcing member 8, and the transition section 10 can be adjusted according to the following proportions:

when the height of the fastening body 2 relative to the plane where the bottom of the support body 1 is located as 100 mm:
    the height of the bottom surface of the second fastening portion 4 relative to the plane where the bottom of the support body 1 is located is 12-15 mm;
    the height of the highest part of the first reinforcing member 8 relative to the plane where the top of the transition section 10 is located is 25-35 mm;
    the height of the highest part of the transition section 10 relative to the plane where the upper surface of the support body 1 is located is 2-3.5 mm.

The above proportions enable the furniture anti-tip device to achieve optimal stability and anti-tip performance.

In a more preferred embodiment, the support body 1 in this embodiment has an upwardly protruding reinforcing strip 11 in the middle to increase the strength of the anti-tip device. Additionally, to reduce material usage and weight, the bottom portion of the support body 1 and the side portion of the fastening body 2 facing the furniture leg 5 can be designed as a hollow structure, with grid-shaped reinforcing ribs 12 at these two locations.

Figure 5:
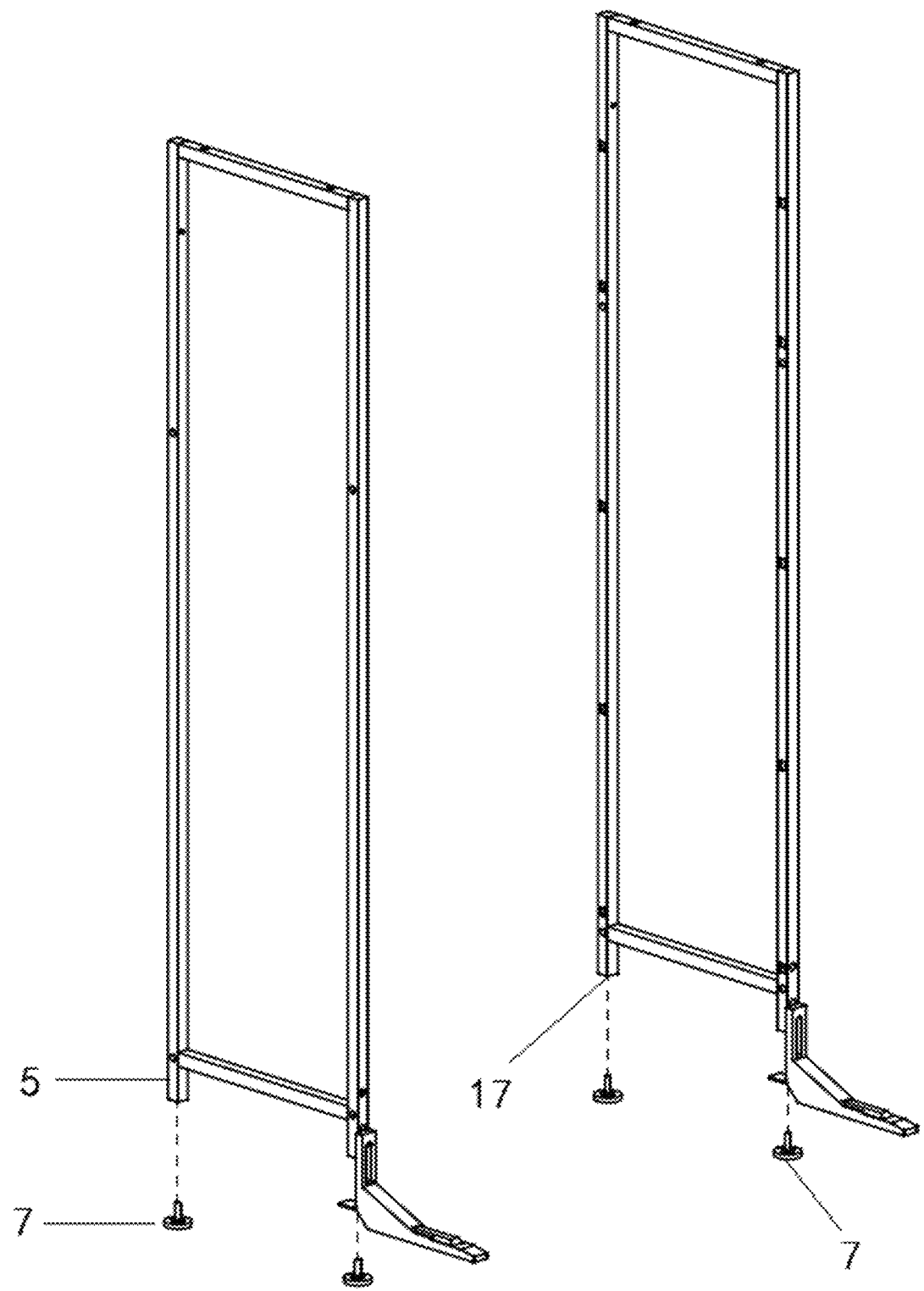
FIG. 5 is a schematic diagram showing a securely fastening between a second fastening portion and a furniture leg.
Figure 6:
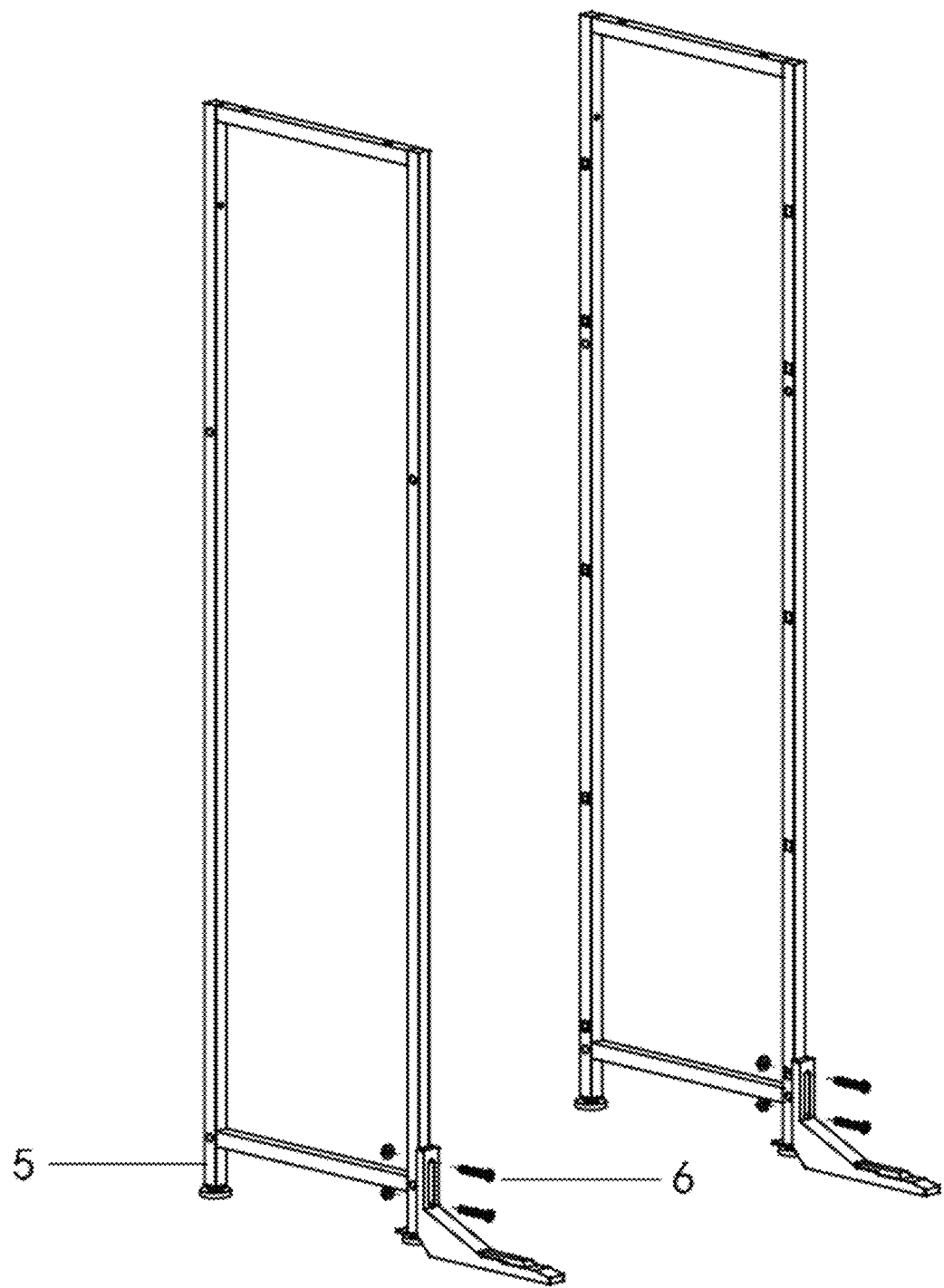
FIG. 6 is a schematic diagram showing a securely fastening between a first fastening portion and the furniture leg.

The assembly process for the furniture anti-tip device in this embodiment can be referenced in FIG. 5 and FIG. 6:
    S1, positioning the fastening body 2 of the furniture anti-tip device close to the front side of the furniture legs 5 (preferably the two legs furthest from the wall);
    S2, passing the second fastening member 7 through the second through hole 16 on the second fastening portion 4 and continue to insert it into the connection hole 17 on the bottom surface of the furniture leg 5; screw the external threads on the second fastening member 7 into the internal threads on the connection hole 17 of the furniture leg 5 to achieve a secure connection between the second fastening portion 4 and the furniture leg 5;
    S3, passing the first fastening member 6 through the first through hole 15 on the first fastening portion 3 and continues to pass the first fastening member 6 through the through hole on the side of the furniture leg 5, and is connected to the threaded connection on the other side of the furniture leg via a nut. After tightening the nut, the first fastening portion 3 is securely connected to the furniture leg 5.

Additionally, since a triangular open area is formed between the furniture leg, the ground, and the anti-tip device, the height of the furniture leg above the ground can be adjusted by regulating the length of the second fastening member 7 inserted into the connection hole (at this point, the relative position of the furniture anti-tip device with respect to the furniture leg also changes; for example, when the length of the second fastening member inserted into the connection hole increases, since the bottom surface of the second fastening member must always remain on the same plane as the bottom surface of the fastening body, the furniture anti-tip device must move upward along the furniture leg), this prevents furniture shaking caused by uneven ground while also preventing furniture tipping, further enhancing the stability of the furniture on the ground. At this point, the first through hole of the first fastening portion 3 is designed as an elongated shape, so that even when the anti-tip device moves up or down, the first fastening portion can always be connected to the side of the furniture leg 5 via the first fastening member 6.

The above-described embodiments are only illustrative descriptions of the present application and do not limit the scope of the present disclosure. Any modifications or improvements made by ordinary technical personnel in the field to the technical solutions of the present application without departing from the spirit of the present application should fall within the scope of protection defined by the present application.

What is claimed is:
1. A furniture anti-tip device, comprising:
    a support structure, comprising a support body, the support body being horizontally arranged;

a fastening structure, comprising a fastening body extending vertically upward along the support structure, two side portions of the fastening body are respectively connected to a side portion of the support body located on the same side via a first reinforcing member;

a first fastening portion, disposed on the fastening body and configured to be securely fastened to a side surface of a furniture leg; and a second fastening portion, disposed on the fastening body, horizontally extending in a direction opposite to the supporting body, and configured to be securely fastened to a bottom surface of the furniture leg; wherein a bottom surface of the second fastening portion is higher than a plane where a bottom surface of the support body is located; and a connection portion between a side of the fastening body which is used to establish a connection with a side of the furniture leg and a bottom surface of the support body forms an inclined surface, the inclined surface tilts toward a direction of the support body, thereby forming a triangular through hole between the furniture leg, a ground, and the furniture anti-tip device.

2. The furniture anti-tip device according to claim 1, wherein the first fastening portion has a first through hole through which a first fastening member passes, with one end of the first fastening member restricted outside the first through hole and an other end securely fastened to the side surface of the furniture leg;

the second fastening portion has a second through hole through which a second fastening member passes, with one end of the second fastening member restricted outside the second through hole and an other end securely fastened to the bottom surface of the furniture leg; and a bottom surface of the second fastening member is in the same plane as a bottom surface of the fastening body after the furniture anti-tip device is assembled with the furniture leg.

3. The furniture anti-tip device according to claim 2, wherein the second fastening member extends into a connection hole provided at a bottom of the furniture leg after passing through the second through hole, the connection hole extends along the axial direction of the furniture leg, and the length of the second fastening member extending into the connection hole is adjustable; and the first through hole is configured such that when the first fastening portion moves upward or downward along the furniture leg, the first fastening member is able to pass through the first through hole and securely fastened to the side of the furniture leg.

4. The furniture anti-tip device according to claim 1, wherein an upper surface of the support body and a surface of the fastening body adjacent to the upper surface of the support body are connected via a second reinforcing member.

5. The furniture anti-tip device according to claim 4, wherein the first reinforcing member has a triangular planar structure, the second reinforcing member has an inclined planar structure, and the first reinforcing member connects to the second reinforcing member.

6. The furniture anti-tip device according to claim 5, wherein a side of the support body is provided with a transition section extending from the end of the first reinforcing member toward the end of the support body.

7. The furniture anti-tip device according to claim 6, wherein sizes of the second fastening section, the first reinforcing member, and the transition section are adjusted according to the following ratio:

when a height of the fastening body relative to the plane where a bottom of the support body is located as 100 mm:

a height of a bottom surface of the second fastening portion relative to a plane where the bottom of the support body is located being 12-15 mm;

a height of a highest part of the first reinforcing member relative to a plane where a top of the transition section is located being 25-35 mm; and a height of a highest part of the transition section relative to a plane where the upper surface of the support body is located being 2-3.5 mm.

8. The furniture anti-tip device according to claim 1, wherein a middle portion of the support body is provided with a reinforcing strip protruding upward; a bottom portion of the support body and a side portion of the fastening body facing the furniture leg are hollow structures and are provided with grid-shaped reinforcing ribs.

* * * * *